United States Patent [19]
Long et al.

[11] Patent Number: 5,220,226
[45] Date of Patent: Jun. 15, 1993

[54] ELECTRIC MOTOR WITH MODULARIZED APPARATUS PLATFORM

[75] Inventors: Norman R. Long, Tipp City, Ohio; James L. King, Sheboygan, Wis.

[73] Assignee: A. O. Smith Corporation, Wilmington, Del.

[21] Appl. No.: 781,518

[22] Filed: Oct. 22, 1991

[51] Int. Cl.⁵ .................... H02K 15/14; H02K 11/00; H02K 5/22
[52] U.S. Cl. ...................... 310/89; 310/42; 310/68 E
[58] Field of Search ............... 310/42, 43, 67 R, 68 E, 310/68 C, 85, 89, 90, 91

[56] References Cited

U.S. PATENT DOCUMENTS

| | | | |
|---|---|---|---|
| 3,244,832 | 4/1966 | Schaeffer | 200/80 R |
| 4,340,830 | 7/1982 | Hoyer-Ellefsen | 310/89 |
| 4,355,253 | 10/1982 | Volbrecht | 310/239 |
| 4,430,063 | 2/1984 | Bach et al. | 434/380 |
| 4,513,214 | 4/1985 | Dieringer | 310/71 |
| 4,614,904 | 9/1986 | Yamazaki et al. | 318/793 |
| 4,673,837 | 6/1987 | Gingerich et al. | 310/239 |
| 4,716,326 | 12/1987 | Fisher | 310/89 |
| 4,801,833 | 1/1989 | Dye | 310/239 |
| 4,972,113 | 11/1990 | Newberg | 310/217 |
| 4,978,876 | 12/1990 | Koster | 310/239 |
| 4,998,865 | 3/1991 | Nakanishi et al. | 417/423.7 |
| 5,004,942 | 4/1991 | King | 310/89 |
| 5,006,743 | 4/1991 | King et al. | 310/89 |
| 5,006,744 | 4/1991 | Archer et al. | 310/89 |
| 5,079,464 | 1/1992 | King et al. | 310/89 |
| 5,097,168 | 3/1992 | Takekoshi et al. | 310/254 |
| 5,127,148 | 7/1992 | Lykes et al. | 29/596 |
| 5,130,587 | 7/1992 | Janisse et al. | 310/89 |

*Primary Examiner*—Steven L. Stephan
*Assistant Examiner*—D. R. Haszko
*Attorney, Agent, or Firm*—Price, David R.; James Earl Lowe, Jr.

[57] ABSTRACT

An electric motor comprising a main frame having an en and an interior, a stator supported within the main frame, an end frame supported within the main frame and spaced from the end of the main frame so as to divide the interior of the main frame into a motor compartment containing the stator and an equipment compartment between the end frame and the end of the main frame, a bearing supported by the end frame, a rotor shaft rotatably supported by the bearing, a rotor located radially inwardly of the stator and mounted on the shaft for rotation therewith, a modularized apparatus platform which is located within the equipment compartment, and which includes a generally cup-shaped portion that opens in the direction away from the end frame and that has an inner surface defining a control chamber, an electrical component supported by the platform and located within the control chamber, and a cap which is fixed to the apparatus platform and which closes the control chamber.

2 Claims, 2 Drawing Sheets

ELECTRIC MOTOR WITH MODULARIZED APPARATUS PLATFORM

BACKGROUND OF THE INVENTION

The invention relates to multiple-compartment electric motors.

A three-compartment electric motor includes a tubular main frame supporting a stator. A lead end frame and an opposite end frame are supported within the main frame on opposite sides of the stator and divide the interior of the main frame into a motor compartment containing the stator, a first auxiliary or equipment compartment outside of the lead end frame, and a second auxiliary compartment outside of the opposite end frame. The equipment compartment contains electrical control elements for operating the motor. A cap is mounted on the end of the main frame and closes the equipment compartment. The second auxiliary compartment contains other components, such as a fan for a pump to which the motor is attached. Each of the end frames supports a bearing, and the motor also includes a rotor unit including a rotor shaft rotatably supported by the bearings. U.S. Pat. No. 5,006,743, which is assigned to the assignee hereof, discloses such a three-compartment electric motor.

A two-compartment motor is substantially identical to a three-compartment motor except that the two-compartment motor does not include the second auxiliary compartment. Instead, the opposite end frame is located adjacent the end of the main frame.

Prior art multiple-compartment motors are assembled by combining four main assemblies, along with the above-described electrical elements, at final assembly. The four main assemblies are the rotor assembly, the main frame and stator assembly, the lead end frame assembly, and the opposite end frame assembly. During final assembly the electrical control elements are installed in the equipment compartment before the motor is closed.

SUMMARY OF THE INVENTION

A prior art multiple-compartment motor can be assembled more quickly if the electrical control elements are assembled prior to final assembly. The invention accordingly provides a modularized apparatus platform to which the electrical components are connected prior to final assembly. The apparatus platform is preferably made of a strong electrically insulating material such as plastic. The modularized apparatus platform and the connected electrical components become a fifth basic assembly brought to final assembly. The apparatus platform is located within the equipment compartment and is electrically connected to the remainder of the motor.

Specifically, the apparatus platform includes a tubular portion or governor tube having an end engaging the lead end frame. The tubular portion defines a bore at least partially containing a centrifugal actuator mounted on the end of the rotor shaft extending into the equipment compartment. The apparatus platform is preferably located relative to the main frame by engagement of the tubular portion or governor tube with the lead end frame.

The modularized apparatus platform also includes a generally cup-shaped portion opening in the direction away from the lead end frame and defining a control chamber. The control chamber communicates with the bore defined by the governor tube, and the control chamber contains a motor start switch supported by the apparatus platform in operative relation to the centrifugal actuator. The control chamber also contains a capacitor and a thermal protector, both of which are supported by the apparatus platform. A cap is fixed to the apparatus platform and closes the control chamber. The motor start switch, the capacitor, and the thermal protector are electrically connected to the stator by suitable wiring. In one embodiment of the invention, a first electrical connector is fixed to the stator, and a second electrical connector is selectively engageable with the first connector and is electrically connected to the apparatus platform and thereby to the motor start switch, the capacitor and the thermal protector.

The motor is assembled by separately assembling the rotor assembly, the main frame and stator assembly, the lead end frame assembly, and the opposite end frame assembly. Additionally, the motor start switch, the capacitor and the thermal protector are connected to the apparatus platform to form the apparatus platform assembly. After completion of these five basic assemblies, all five are put together at final assembly. The apparatus platform provides an electrically insulating and strong mounting surface for the electrical components of the motor. The entire control chamber and the components therein are insulated by the platform.

Other features and advantages of the invention will become apparent to those skilled in the art upon review of the following detailed description, claims and drawings.

Figure 1:
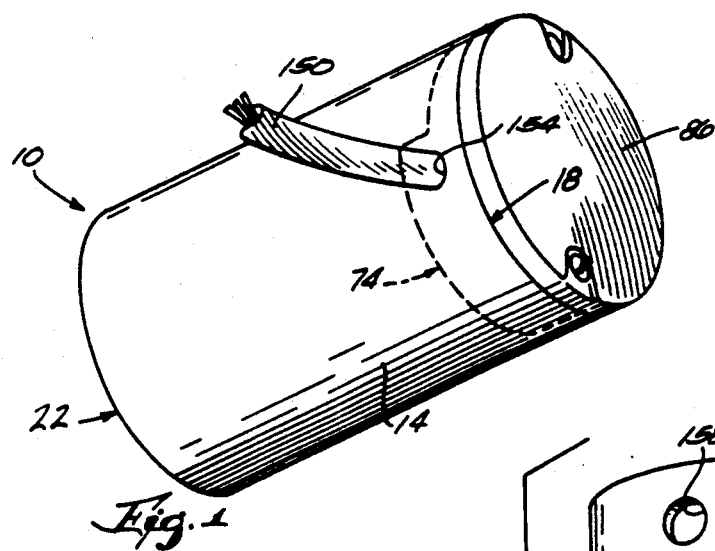
FIG. 1 is a perspective view of an electric motor embodying the invention and comprising a main frame, a modularized apparatus platform, and a cap.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An electric motor 10 embodying the invention is illustrated in the drawings. The motor 10 comprises a tubular main frame 14 having a lead end 18 and an opposite end 22. A conventional stator 26 (see FIG. 4) is supported within the main frame 14. The main frame 14 and the stator 26 form a main frame and stator assembly.

The motor 10 also comprises (see FIG. 4) a lead end frame 30 and an opposite end frame 34 supported within the main frame 14. The lead end frame 30 is spaced from the lead end 18 of the main frame 14, and the opposite end frame 34 is spaced from the frame 30 and from the opposite end 22 of the main frame 14 so that the end frames 30 and 34 divide the interior of the main frame 14 into a motor compartment 38, an equipment compartment 42 and an auxiliary compartment 46. The motor compartment 38 is located between the end frames 30 and 34 and contains the stator 26. The equipment compartment 42 is located outwardly of the lead end frame 30 (to the left in FIG. 4) and between the lead end frame 30 and the lead end 18 of the main frame 14. The auxiliary compartment 46 is located outwardly of the opposite end frame 34 (to the right in FIG. 4). The auxiliary compartment 46 can contain auxiliary equipment such as that described in U.S. Pat. No. 5,006,743, which is incorporated herein by reference. A conventional bearing 50 is supported by the lead end frame 30, and a conventional bearing 54 is supported by the opposite end frame 34. The lead end frame 30 and the bearing 50 form a lead end frame assembly, and the opposite end frame 34 and the bearing 54 form an opposite end frame assembly.

Figure 4:
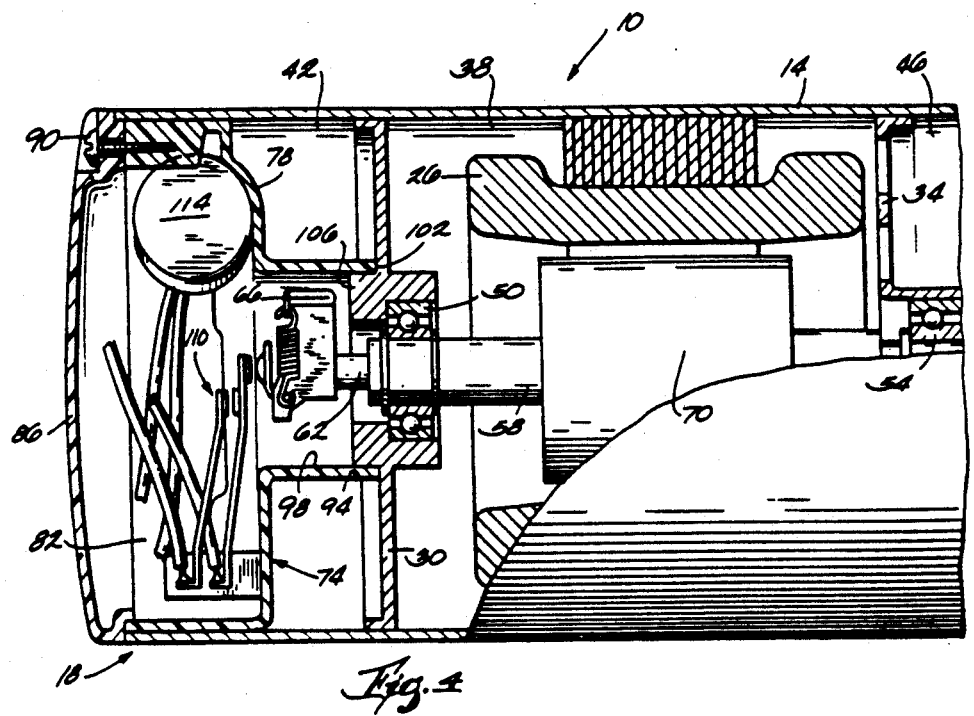
FIG. 4 is an elevational view, partially in section, of the motor.
Figure 5:
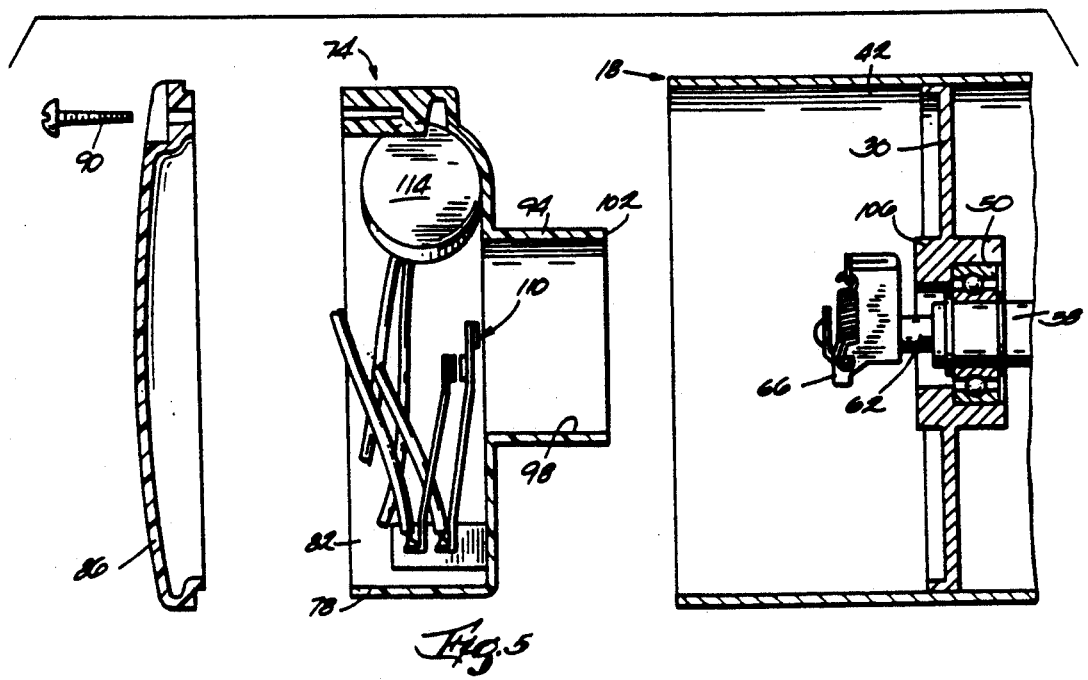
FIG. 5 is an exploded, sectional view of the cap, the apparatus platform and the main frame.

The motor 10 further comprises a rotor shaft 58 rotatably supported by the bearings 50 and 54. The rotor shaft 58 has an end portion 62 extending into the equipment compartment 42, as shown in FIG. 4. A centrifugal actuator 66 is located in the equipment compartment 42 and is mounted on the end portion 62 of the rotor shaft 58 for rotation therewith. A rotor 70 is located radially inwardly of the stator 26 and is mounted on the rotor shaft 58 for rotation therewith. The rotor 70 and the rotor shaft 58 form a rotor assembly. The motor 10 as thus far described is conventional and is substantially identical to the motor disclosed in U.S. Pat. No. 5,006,743.

The motor 10 further comprises a modularized apparatus platform 74 located within the equipment compartment 42. The platform 74 is made of a strong insulating material such as plastic. The platform 74 includes a generally cup-shaped portion 78 that opens in the direction away from the lead end frame 30 (to the left in FIG. 4) and that has an inner surface defining a control chamber 82. The cup-shaped portion 78 of the platform 74 is preferably press fit into the equipment compartment 42 of the main frame 14. Alternatively, the platform 74 can be bonded to the main frame 14, can be secured to the main frame 14 by screws, or can be snapped into the main frame 14, or the main frame 14 can be cold formed into the outer surface of the platform 74.

A cap 86 is fixed to the outer end of the apparatus platform 74 and closes the control chamber 82. While various suitable means can be used for securing the cap 86 to the apparatus platform 74, in the illustrated construction, the cap 86 is secured to the apparatus platform 74 by a plurality of screws 90. In an alternative construction (not shown), the cap 86 can snap onto the platform 74 and be disengaged by a suitable tool.

The platform 74 also includes a tubular portion or governor tube 94 defining a bore 98 extending from the control chamber 82. The bore 98 at least partially contains the centrifugal actuator 66. The governor tube 94 has an inner end 102 engaging the end frame 30 so as to locate the apparatus platform 74 axially of the main frame 14. In the illustrated construction, as shown in FIG. 4, the outer surface of the lead end frame 30 forms a cylindrical boss 106 that extends into the governor tube 94 to locate the governor tube 94 radially of the main frame 14. The inner end 102 of the governor tube 94 engages the portion of the lead end frame 30 surrounding the boss 106.

In alternative embodiments of the invention (not shown), other arrangements can be used to locate the platform 74 relative to the main frame 14. For example, the platform 74 can include a flange engaging the lead end 18 of the frame 14 so as to locate the platform 74 relative to the lead end 18 of the main frame 14. Alternatively, a stop on the platform 74 can engage the end portion 62 of the rotor shaft 58 so as to locate the platform 74 relative to the rotor shaft 58.

Figure 3:
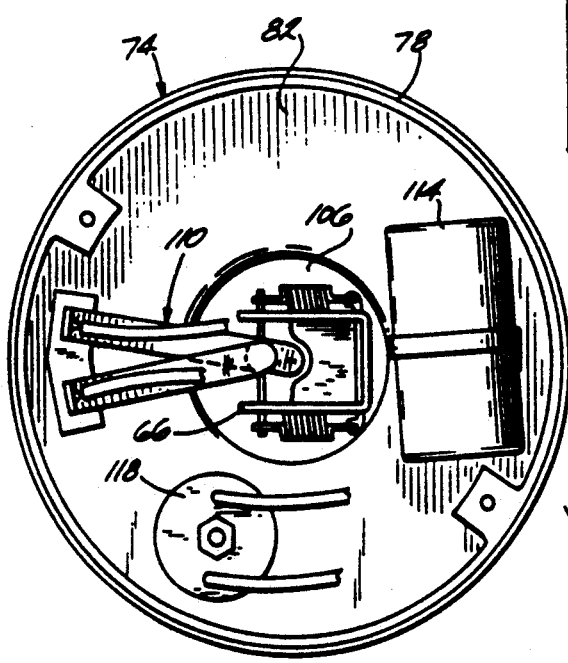
FIG. 3 is an end view of the apparatus platform seated within the main frame.

The motor 10 further comprises a conventional motor start switch 110 supported by the apparatus platform 74 and located within the control chamber 82 in operative relation to the centrifugal actuator 66. As is known in the art, the centrifugal actuator 66 functions as a governor and is operable to close the motor start switch 110 and thereby interrupt power to the motor 10 when the rotor shaft 58 exceeds a predetermined rotational speed. A conventional capacitor 114 and a conventional thermal protector 118 (FIG. 3) are also supported by the apparatus platform 74 and located within the control chamber 82. Any suitable means can be employed for connecting the motor start switch 110, the capacitor 114 and the thermal protector 118 to the apparatus platform 74. The platform 74 and the enclosed electrical components form a platform assembly. Other electrical components known in the art can be contained within the control chamber 82 of the platform 74.

Figure 2:
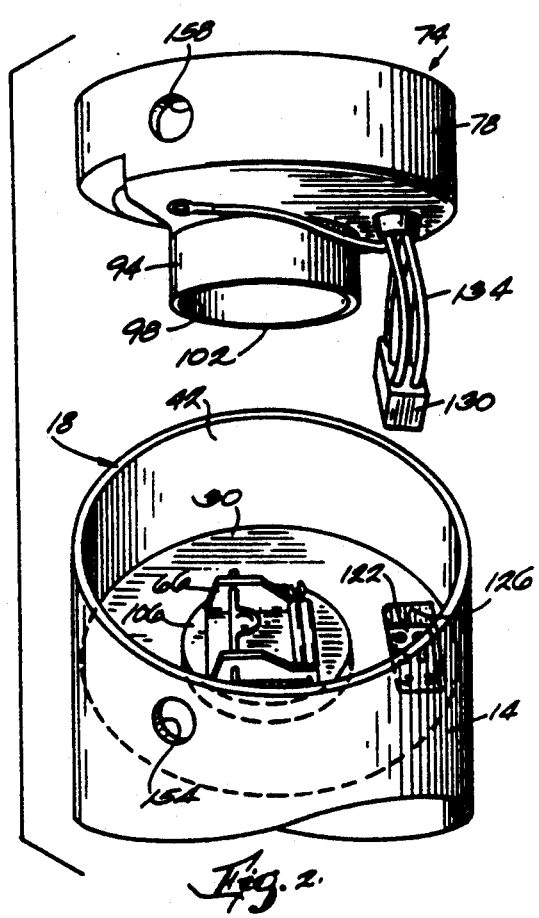
FIG. 2 is an exploded, partial, perspective view of the apparatus platform and the main frame.

The motor 10 also comprises means electrically connecting the motor start switch 110, the capacitor 114 and the thermal protector 118 to the stator 26. In the illustrated embodiment of the invention, such means includes (see FIG. 2) an electrical connector 122 fixed to and electrically connected to the stator 26. As shown in FIG. 2, the lead end frame 30 has therein an opening or window 126 affording access to the connector 122. The electrical connecting means also includes an electrical connector 130 which is selectively engageable with the electrical connector 122 and which is electrically connected by wires 134 to the apparatus platform 74 and thereby to the motor start switch 110, the capacitor 114 and the thermal protector 118. The wires 134 are shielded from the centrifugal actuator 66 by the governor tube 94. Engagement of the electrical connectors 122 and 130 connects the motor start switch 110, the capacitor 114 and the thermal protector 118 to the stator 26. In another embodiment of the invention (not shown), the motor start switch 110, the capacitor 114 and the thermal protector 118 can be hard wired to the stator 26 as is known in the art.

Power for the motor 10 is provided by (see FIG. 1) an electrical cable 150 that extends into the control compartment 82 of the platform 74 via (see FIGS. 1 and 2) an opening 154 in the main frame 14 and an aligned opening 158 in the platform 74.

The motor 10 is assembled by separately assembling the rotor assembly, the main frame and stator assembly, the lead end frame assembly, the opposite end frame assembly, and the apparatus platform assembly. After completion of these five basic assemblies, all five are put together at final assembly. Electrical connections can be checked prior to final assembly.

Different motors require different capacitors and either different or no thermal protection, although the remainder of the motor is the same. The use of the modular apparatus platform of the invention simplifies the construction of different motors by allowing for the inventorying of platforms with different electrical components and then selecting a particular platform and assembling the platform with the remainder of the motor. This reduces the need to inventory a number of different complete motors.

Various features of the invention are set forth in the following claims.

We claim:

1. An electric motor comprising
    a tubular main frame having an end,
    a stator supported within said main frame,
    an end frame supported within said main frame and spaced from said end of said main frame so as to divide the interior of said main frame into a motor compartment containing said stator and an equipment compartment between said end frame and said end of said main frame,
    a bearing supported by said end frame,
    a rotor shaft which is rotatably supported by said bearing and which extends into said equipment compartment,
    a rotor located radially inwardly of said stator and mounted on said shaft for rotation therewith,
    a centrifugal actuator located in said equipment compartment and mounted on said shaft for rotation therewith,
    a modularized apparatus platform which is located within said equipment compartment, which includes a generally cup-shaped portion that opens in the direction away from said end frame and that has an inner surface defining a control chamber, and which includes a tubular portion that has an end engaging said end frame and that defines a bore extending from said control chamber and at least partially containing said centrifugal actuator,
    a motor start switch supported by said apparatus platform and located within said control chamber in operative relation to said centrifugal actuator,
    an electrical component supported by said apparatus platform and located within said control chamber,
    means selectively electrically connecting said motor start switch, and said electrical component to said stator, and
    a cap which closes said equipment compartment.

2. A motor as set forth in claim 1 wherein said cap is fixed to said apparatus platform and closes said control chamber.

* * * * *